No. 645,393. Patented Mar. 13, 1900.
E. C. HOELSCHER & J. CLIFFORD.
ENAMELING TABLE OR MACHINE.
(Application filed July 5, 1898.)
(No Model.) 2 Sheets—Sheet 2.
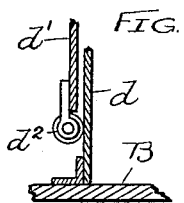
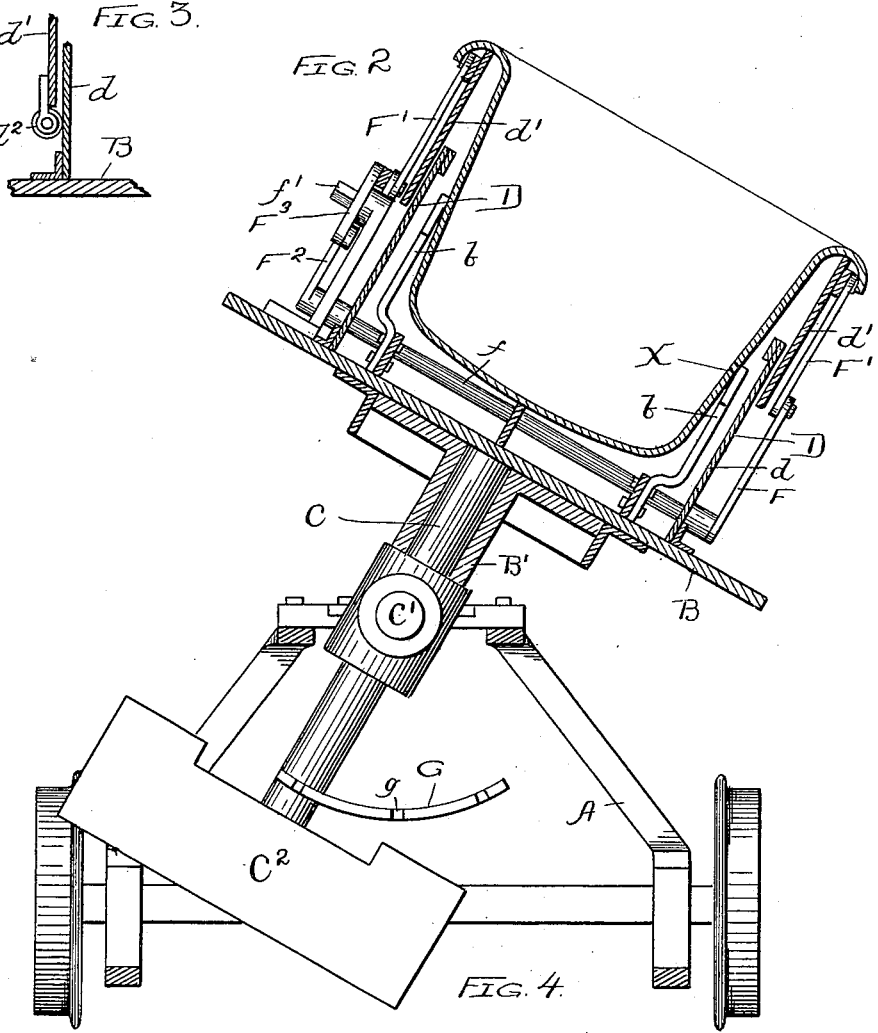
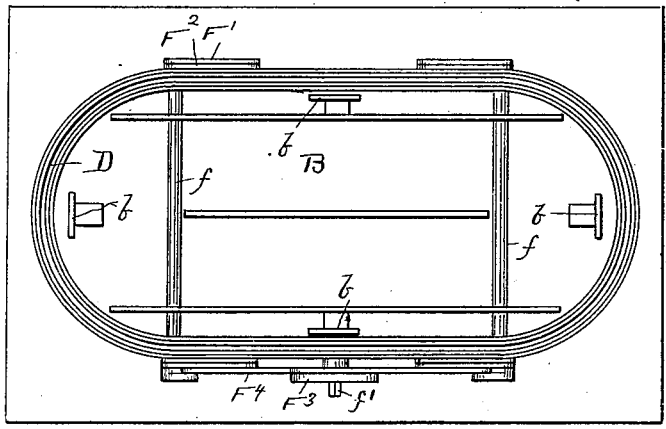
WITNESSES:
Geo. E. Curtis
INVENTORS
EDWARD C. HOELSCHER
JOHN CLIFFORD.
BY
Munday,
Evarts and
Adcock.
ATTORNEYS.

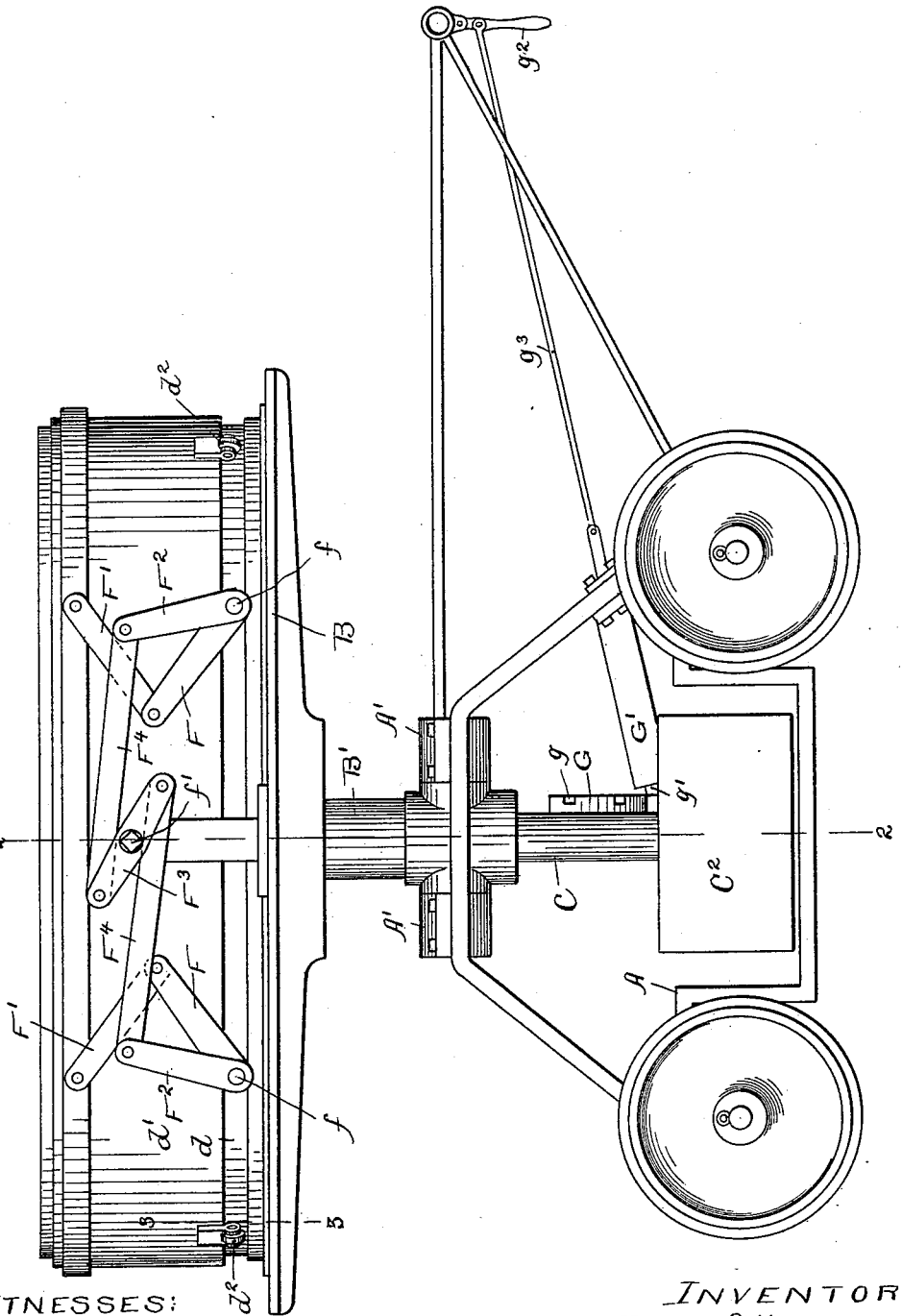

UNITED STATES PATENT OFFICE.

EDWARD C. HOELSCHER AND JOHN CLIFFORD, OF CHICAGO, ILLINOIS, ASSIGNORS TO THE L. WOLFF MANUFACTURING COMPANY, OF SAME PLACE.

ENAMELING TABLE OR MACHINE.

SPECIFICATION forming part of Letters Patent No. 645,393, dated March 13, 1900.

Application filed July 5, 1898. Serial No. 685,188. (No model.)

*To all whom it may concern:*

Be it known that we, EDWARD C. HOELSCHER and JOHN CLIFFORD, citizens of the United States, residing in Chicago, in the county of Cook and State of Illinois, have invented a new and useful Improvement in Enameling Tables or Machines, of which the following is a specification.

Our invention relates to improvements in enameling tables or machines employed in the manufacture of enameled-iron bath-tubs or other enameled-iron vessels or ware for holding the heated tub, vessel, or other article while the enameling-powder is being dusted upon the heated vessel or article. These enameling-tables as heretofore constructed have simply been provided on their upper face with a suitable cradle or seat to receive the vessel or article and properly hold it while the table is being inclined in the different positions required and turned or rotated on its axis, and considerable loss of time and labor, difficulty, and inconvenience have heretofore been experienced in the practical use of such enameling-tables. The enameling-powder is liable to be sprinkled more or less upon the outer surface of the heated tub or vessel, so that the outer surface of the vessel will be spotted with enamel and requiring a good deal of time and labor to chip and grind it off in order to produce a neat finished article. The rapid radiation of heat from the outside of the heated vessel produces great inconvenience to the workmen employed in dusting or sprinkling the enamel-powder and in turning the table and vessel thereon and also requiring the vessel to be heated to a higher heat and a greater loss of time between heats.

The object of our invention is to provide an enameling-table of an efficient, simple, and durable construction upon which the heated tub or vessel to be enameled may be quickly and conveniently placed and from which it can be readily removed and by which the objections or difficulties heretofore experienced may be overcome or obviated.

To this end our invention consists in an enameling-table provided with an extensible or collapsible case or muffler adapted to surround and protect the outside of the heated tub or vessel to be enameled, so that the outside of the heated tub or vessel will be protected from all danger of the enameling-powder being accidentally dusted or sprinkled upon it, thus entirely obviating all necessity for chipping or grinding off the enamel from the outside of the tub, so that the workmen will be largely protected from the heat of the vessel, so that the heat will be better and longer retained in the vessel, thus rendering it unnecessary to heat the vessel to so high a degree to receive the enameling-powder and also saving time in reheating the vessel to receive the next coating. The case or muffler surrounding the heated tub or vessel to be enameled may be made collapsible or extensible in any suitable manner; but we prefer to make it in telescopic sections.

Our invention also consists in the novel construction of parts and devices and in the novel combinations of parts and devices herein shown and described, and specified in the claims.

In the accompanying drawings, forming a part of this specification, Figure 1 is a side elevation of an enameling table or machine embodying our invention. Fig. 2 is a vertical section on the line 2 2 of Fig. 1. Fig. 3 is a detail section on line 3 3 of Fig. 1, and Fig. 4 is a plan view.

In the drawings, A represents the truck or movable frame upon which the enameling-table B is mounted. C is a swinging shaft or spindle pivoted to the truck or frame A in the housing A' thereon by the horizontal pivot or shaft C'. The swinging spindle C is provided with a counterbalance-weight $C^2$ to counterbalance the table B and the tub or vessel X to be enameled thereon.

The table B is provided on its upper surface with a number of projecting arms $b$ to form a cradle or seat to receive the vessel and hold the same in position while the table B is being inclined in different positions and turned or rotated on its axis.

B' is a hub secured to the table B and surrounding the upper end of the spindle C to form a bearing for the table on the swinging spindle.

D is a case or muffler mounted upon the table B and adapted to surround the heated tub or vessel X to be enameled and to protect the outside of the vessel from radiation of heat. This case is made in two or more folding, extensible, or collapsible parts or sections $d\ d'$, said parts or sections preferably being telescopic or telescoping one within the other, as illustrated in the drawings. The lower part or section $d$ of the case is thus secured rigidly to the table B, while the upper or movable section $d'$ is movably connected to the lower section by the toggle-links F F'. The toggle-links F each have a bent arm $F^2$, connecting with the operating-lever $F^3$ by the pivoted links $F^4$, so that the pairs of toggle links or arms F F' on each side of the case are simultaneously operated from said lever $F^3$. The toggle links or levers F F on opposite sides of the case A are rigidly secured to a common shaft $f$, so that the toggle links or arms on both sides of the case are likewise simultaneously operated. The operating-lever $F^3$ is provided with a squared shaft $f'$ to receive a removable hand-lever for turning said lever $F^3$.

To prevent any danger of the two sections $d\ d'$ of the case sticking or catching one on the other, we provide the movable section $d'$ with antifriction-rollers $d^2$. This facilitates the sliding of the telescopic section.

To lock or hold the table B at any desired inclination, its swinging spindle C is provided with a rack or notched segment G, the notches $g$ of which are engaged by a sliding bar $g'$, which is reciprocated in its guide $G'$ by a lever $g^2$ and connecting-link $g^3$.

We claim—

1. The combination in an enameling-table, of a folding extensible or collapsible case or muffler adapted to surround and protect the outside of the heated vessel or article to be enameled, substantially as specified.

2. The combination with an enameling-table, of a telescopic case or muffler, substantially as specified.

3. The combination with an enameling-table, of a case or muffler composed of telescopic sections connected together by toggle links or levers, and means for simultaneously operating the toggle links or levers, substantially as specified.

4. The combination with the enameling-table B, of a telescopic case or muffler D composed of a fixed section $d$ and a movable section $d'$, toggle-links F F', arms $F^2$, operating-lever $F^3$ and connecting-links $F^4$, substantially as specified.

5. The combination with the enameling-table B, of a telescopic case or muffler D composed of a fixed section $d$ and a movable section $d'$, toggle-links F F', arms $F^2$, operating-lever $F^3$, and connecting-links $F^4$, the toggle-links F on opposite sides of the case being secured to a common shaft, substantially as specified.

6. The combination with a rotating swinging enameling-table, of a telescopic case or muffler, and mechanism for opening and closing the parts or sections of said case, substantially as specified.

EDWARD C. HOELSCHER.
JOHN CLIFFORD.

Witnesses:
H. M. MUNDAY,
EDMUND ADCOCK.